United States Patent
Mitchell et al.

(10) Patent No.: US 9,707,591 B1
(45) Date of Patent: *Jul. 18, 2017

(54) METHOD OF COATING AN EXTRUDED MEMBER

(71) Applicant: Royal Group, Inc., Ontario OT (CA)

(72) Inventors: Steven Mitchell, Chilhowie, VA (US); Brandon Nadler, Abingdon, VA (US); Bob Campbell, Mouth of Wilson, VA (US)

(73) Assignee: ROYAL GROUP, INC., Woodbridge, Ontario (CA)

( * ) Notice: Subject to any disclaimer, the term of this patent is extended or adjusted under 35 U.S.C. 154(b) by 180 days.

This patent is subject to a terminal disclaimer.

(21) Appl. No.: 14/610,093

(22) Filed: Jan. 30, 2015

Related U.S. Application Data

(63) Continuation of application No. 13/464,066, filed on May 4, 2012, now Pat. No. 8,974,619.

(60) Provisional application No. 61/482,688, filed on May 5, 2011.

(51) Int. Cl.
*B05D 1/26* (2006.01)

(52) U.S. Cl.
CPC .......... *B05D 1/265* (2013.01); *B05D 2502/00* (2013.01); *B05D 2506/25* (2013.01)

(58) Field of Classification Search
None
See application file for complete search history.

(56) References Cited

U.S. PATENT DOCUMENTS

| | | | |
|---|---|---|---|
| 5,094,792 A * | 3/1992 | Baran | B29C 47/003 118/411 |
| 6,958,185 B1 * | 10/2005 | Zehner | B32B 23/08 428/317.9 |
| 8,974,619 B1 * | 3/2015 | Mitchell | B29C 47/0019 156/244.16 |
| 2007/0154689 A1 * | 7/2007 | Hughes | B32B 21/02 428/195.1 |
| 2008/0138560 A1 * | 6/2008 | Windmoller | B32B 3/02 428/46 |

FOREIGN PATENT DOCUMENTS

BE   WO 2011141849 A2 *  11/2011  ............... B32B 7/12

* cited by examiner

*Primary Examiner* — Barbara J Musser
(74) *Attorney, Agent, or Firm* — Hunton & Williams LLP

(57) ABSTRACT

A method of coating an extruded member includes advancing an extruded member through a coating die and applying an outer layer material on to the extruded member with the coating die while a floating support supports the extruded member and makes vertical adjustments to the extruded member to maintain a substantially constant thickness of the outer layer material.

20 Claims, 15 Drawing Sheets

METHOD OF COATING AN EXTRUDED MEMBER

CROSS-REFERENCE TO RELATED APPLICATIONS

This application is a continuation of U.S. application Ser. No. 13/464,066 filed May 4, 2012, now U.S. Pat. No. 8,974,619, which claims the benefit of priority of U.S. provisional application No. 61/482,688 filed May 5, 2011, all of which are incorporated herein by reference.

BACKGROUND

The present embodiments relate to a method of making a decorated extruded profile.

SUMMARY

One or more embodiments include a method for making a decorated extruded profile. According to the embodiments, a method includes extruding a composition through an aperture in a die head, to form an extruded member having a substantially constant cross-section along a longitudinal dimension, and at least one surface to be decorated. The method of the embodiments further includes: applying a decoration to the at least one surface to be decorated to provide a decorated surface; extruding a coating material on to at least the decorated surface of the extruded member; and embossing an embossing texture on to at least the decorated surface of the extruded member.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Figure 1:
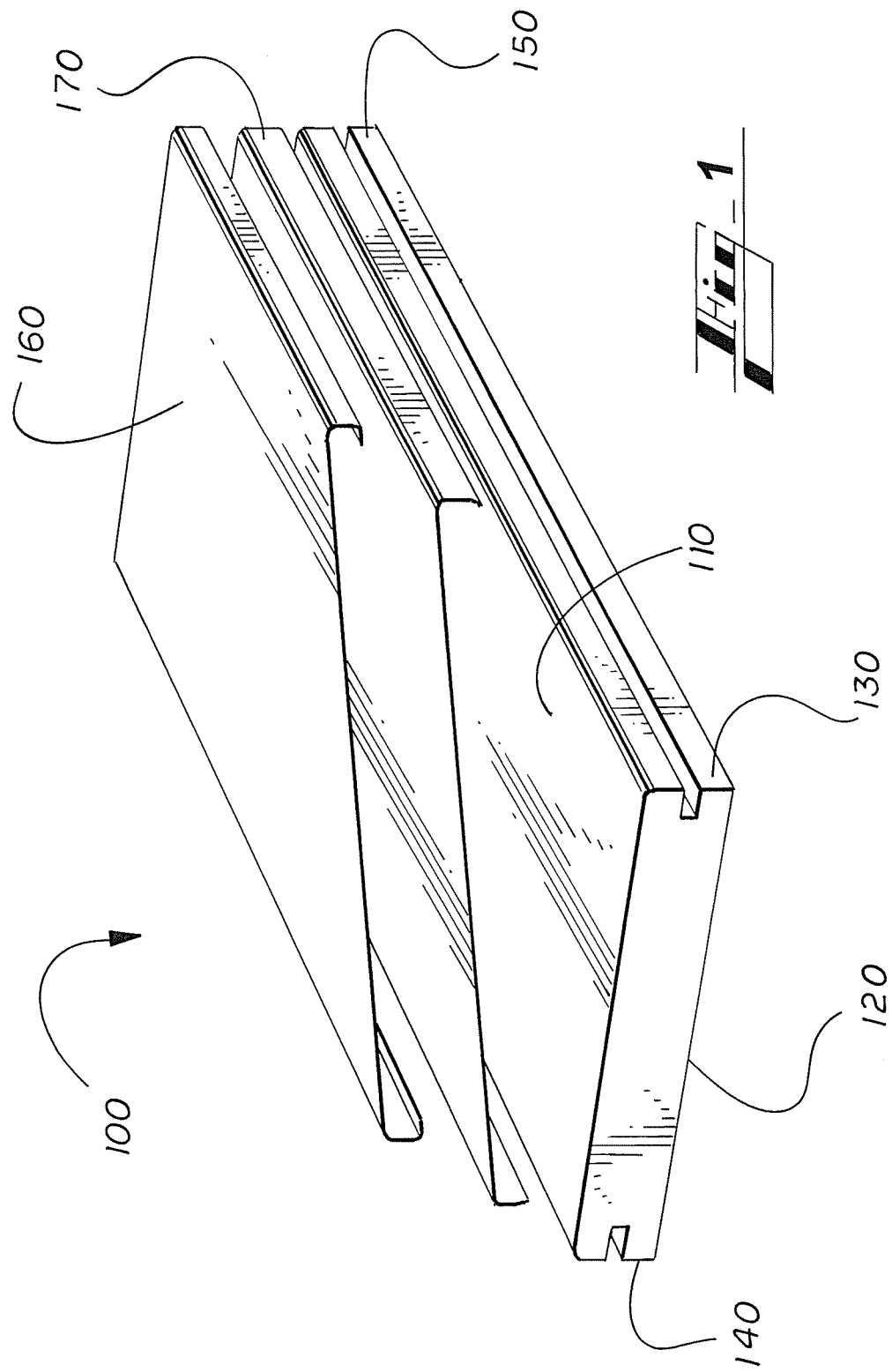
FIG. 1 illustrates an extruded board and its components, according to an exemplary embodiment.

The following description is intended to convey a thorough understanding of the embodiments by providing a number of specific embodiments and details involving a method and apparatus for manufacturing a decorated extruded profile. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the various exemplary embodiments described herein relate to an apparatus and a method for forming a decorated extruded article. The articles produced by the process have a decorative appearance, such as a wood-grain pattern, and have an extruded protective coating on one or more surfaces.

The resultant articles may be useful in, for example, deck systems, fence systems, building products, floor coverings, or components thereof, such as planks, slats, rails, posts, flooring, siding, roofing materials, and the like. The articles are relatively easy to manufacture in a variety of configurations using relatively inexpensive materials. In addition, the articles may have many of the desirable properties of natural wood products, and may be sturdy, lightweight, and have excellent weatherability properties.

An exemplary method will be described in terms of the following steps involved in manufacturing an extruded profile. The exemplary method may include some or all of the steps described herein. While the steps are described in a certain order, it will be understood that one or more of the steps may be performed in a different order, or may be performed simultaneously. In an exemplary embodiment, the method is performed in a continuous process, e.g., so that the work product moves substantially continuously from step to step, without interruption. However, it will be understood that the method according to the exemplary embodiments may be performed in a batch or semi-batch process, with one or more of the steps performed during a particular batch operation.

Extrusion

In an exemplary embodiment, the method includes the step of making an extruded profile. The profile may be made of any rigid or cellular polymeric material. In exemplary embodiments, the extruded profile may contain a polyvinyl chloride (PVC) or chlorinated polyvinyl chloride (CPVC) resin. Other suitable polymeric materials include polyethylene, polypropylene, polybutylene, polyisoprene, or copolymers or mixtures thereof. The extruded profile also may contain minor amounts of additives such as process aids, process modifiers, solid fillers, lubricants, colorants, stabilizers, blowing agents, curing compounds, and/or other materials as necessary or desired. Exemplary process aids include materials which are known to adjust extrudability properties, thus enabling adjustment of extrusion conditions. Exemplary process modifiers include additives for adjusting physical properties of the extruded product.

In some embodiments, the profile may have a first portion comprising a first material, and a second portion (e.g., co-extruded portion) comprising a second material.

In an exemplary method, the step of making an extruded profile may include melting and mixing a polymer formulation, such as in a mixer or extruder. The materials may be mixed in any order. The materials may be mixed at or below the melting temperature of the polymer resin component. Melting and mixing may be accomplished in one step, or in multiple steps, as necessary or desired. The molten polymer formulation may be cooled, and then re-melted at a later time, in preparation for extrusion. One having ordinary skill in the art, having read this disclosure, would understand the various means for melting and mixing the polymer formulation, in preparation for extrusion.

In an exemplary embodiment, the molten polymer mixture may be forced, under pressure, through one or more orifices in an extrusion die to form an extruded profile. Any suitable die assembly may be used in the exemplary method. The one or more orifices in the die are configured to produce an extruded profile having a predetermined shape. In an exemplary embodiment, the extruded profile is continuously formed in a machine direction, so that it has a substantially constant cross-sectional profile throughout its machine direction.

In some embodiments, where the profile is a co-extruded member, one or more dies may be provided with openings corresponding to each of the respective co-extruded polymeric materials.

Shaping and Cooling

In an exemplary method, the extrusion step is followed by a shaping and cooling step. In this step, the extruded profile is manipulated while it is still malleable to continue to shape it, and then cooled to harden the profile and set it in a predetermined shape.

In an exemplary method the shaping and cooling step includes a dry calibration step, in which the process is shaped and cooled. For example, the extruded profile may pass through an apparatus having a sleeve with a smooth guide wall. The sleeve has substantially the same cross-sectional shape as the die. The sleeve may be larger than the die, to allow some expansion of the extrudate, e.g., from foaming. The apparatus preferably includes a heat controlling jacket with a connection to enable a temperature regulating fluid, such as water, to be contained within the jacket. Preferably, the cooling temperature is below the melting temperature of the extruded composition. A vacuum draw on the apparatus helps to maintain the profile shape as extruded profile passes through the sleeve. As the profile is drawn through the apparatus, the profile achieves a cross-section that is substantially the same as the cross-section of the sleeve of the apparatus. The resulting product, including its shape and its structural properties, may be affected by the vacuum level, cooling temperature, and the speed of the extrusion profile through the calibration apparatus.

In an exemplary method, the shaping and cooling step includes a wet calibration step. Generally speaking, in the wet calibration, the profile is introduced to a vacuum tank, and sprayed with chilled water to continue shaping and cooling the profile. The application of a vacuum to the extruded profile may help to maintain the profile shape or not allow the profile to collapse due to molten interior of the part.

One or more additional means may be used, as necessary or desired, in addition to the wet and/or dry calibration to affect the shape of the extruded profile. For example, heat guns may be applied to areas to relieve stress and warpage which may have been incurred in the cooling and shaping operations.

In some exemplary methods, the shaping and cooling step may include a combination of one or more of the above steps.

Hot Stamp Lamination

In an exemplary method, the shaping and cooling step may be followed by a decorating step. The shaped and cooled extruded profile includes at least one surface to be decorated. In the decorating step, one or more surfaces of the cooled and shaped extrusion may be treated to provide a decorative appearance. For example, a surface may be printed, colored, painted, or the like, to provide any necessary or desired appearance. In an exemplary embodiment, one or more of the surfaces of the extruded profile are treated to provide a wood-grain appearance.

In an exemplary method, a decorative foil (e.g., a heat transfer foil or a hot stamp foil) may be applied to at least one surface of the extruded profile. The decorative foil may be configured to provide any necessary or desired visual image (e.g., wood pattern, solid colors, fibers, metals, photographed images, computer generated images, etc.) to a surface of the extruded profile.

Any suitable hot stamp process may be used to combine the decorative foil with the extruded profile. For example, a conventional hot stamp process may be used, in which a thin (e.g., 0.0005"-0.0015") layer or layers of material are applied to the outer surface of an extrusion. The materials may include one or more layers, including: a heat sensitive adhesive layer, an ink layer, and one or more other layers as necessary and/or desired. The hot stamp layer(s) may be disposed on a carrier film (e.g., MYLAR) prior to being laminated to the extruded profile. For example, the hot stamp layers and carrier film may be deposited on the carrier film, and then wound in a roll. The roll of carrier film and the hot stamp layer(s) may be unwound and positioned adjacent to the one or more surfaces of the extruded profile to be decorated. The web of hot stamp foil material may be superposed and laminated onto the surface of the extruded profile, by the use of heat and/or pressure. Any means of providing heat and/or pressure may be applied to the carrier film and hot stamp layers to provide necessary or desired lamination properties. In an exemplary embodiment the carrier film carrying the hot stamp layers and the extruded profile pass between a heated transfer roller and a nip roller, which apply heat and pressure to the carrier film. An adhesive layer is activated by the heat and pressure applied by the heated transfer roller, adhering one or more decorative layers to the profile. After the hot stamp layers have been transferred to and laminated to the extruded profile, the carrier layer may be removed and collected, such as on a rewind wheel.

Coating/Extrusion

In an exemplary method, an outer layer (e.g., a coating, an extruded layer, a capstock) may be applied to a surface of the extruded profile. The outer layer may be applied to the extruded profile to provide aesthetics, weatherability, wear-ability, color retention, stain resistance, and/or other characteristics as necessary or desired. Any suitable coating material may be used such as, for example, an acrylic-containing resin such as acrylonitrile-ethylene-propylene-styrene (AES), acrylic-styrene acrylonitrile (ASA), acrylonitrile-butadiene-styrene (ABS), styrene acrylonitrile (SAN), acrylic polyolefins (e.g., polystyrene, polyethylene, and polypropylene), thermoplastic polyurethane, PVC, polycarbonate, methyl methacrylate, poly methyl methacrylate and combinations and mixtures thereof. In an exemplary embodiment the coating may include ALTUGLAS or SOLARKOTE acrylic resin capstock materials (sold by Arkema Inc.). The coating material may be transparent, opaque, and/or translucent. In one or more exemplary embodiments, an acrylic-based coating may be extruded onto the one or more decorated surfaces, to provide wearability and weatherability properties, such as abrasion resistance, UV resistance, and resistance to water and humidity exposure. The coating composition may include one or more additional components, including process aids, impact modifiers, fillers, color accent pellets, and the like.

Any suitable method may be used to apply the outer layer, including, for example, spraying, inkjet printing, gravure roll coating, extruding, etc. In an exemplary method, the outer layer is extruded onto one or more surfaces of the extruded profile. For example, the molten coating mixture may be melted and mixed in an extruder, and passed through a cross-head die, such as a saddle die that is configured to receive a portion of the extruded profile, and extrude thereon a thin coating layer. The coating extrusion process may operate under predetermined temperature and pressure conditions, to produce a necessary or desired coating layer.

In some embodiments, the coating process may be followed by a shaping/cooling process to continue to shape the coating layer and cool it in its desired shape. For example, one or more of the coated surfaces may be shaped and/or cooled using one or more of the processes described in reference to shaping or cooling the extruded profile.

Embossing

In an exemplary embodiment, one or more of the coated surfaces may be contacted with a textured roller, or an embossing roller to texturize the surface. For example, the extruded profile may be pulled between an embossing roller and a back-up roller, so that a surface to be embossed is in contact with the embossing roller. In some embodiments, the back-up roller may also be configured to provide an embossed texture on a respective surface of the extruded profile. The embossing roller may have on its peripheral surface the pattern to be embossed on the respective surface of the extruded profile. The pattern on the surface of the embossing roller is an inverse of the texture desired on the extruded profile. The embossing roller may be configured to provide any necessary or desired texture on the surface of the extruded profile. In an exemplary embodiment, the embossing roller is configured to provide a wood grain pattern on the extruded profile. The embossing roller and back-up roller are operably coupled so that they rotate at a predetermined speed and in a predetermined direction, to pull the extruded profile through the rollers. Any suitable mechanism may be used to provide the necessary or desired rotation to the embossing roller and back-up roller. The embossing roller and back-up roller are operably coupled so as to provide a predetermined pressure on the extruded profile as it passes therebetween, so that the embossing roller may provide an impression on the surface of the extruded profile. Any suitable mechanism may be provided to provide the necessary or desired pressure between the embossing roller and back-up roller. In exemplary embodiments, the pressure between the embossing roller and back-up roller may be sufficient to compress the profile to a desired thickness.

In exemplary embodiments, more than one surface of the extruded profile may be embossed. For example, the extruded profile may be pulled through two rotating embossing rollers, under pressure, so that each surface of the extruded profile that is in contact with a roller is embossed with a pattern. One or more additional embossing stations may be provided, so that additional surfaces may be embossed.

In some exemplary embodiments, the embossing rollers, or additional rollers may be provided to compress the extruded profile so as to adjust its thickness. For example, a set of rotating compression rollers (and/or embossing rollers) may be provided, and the extruded profile may be pulled through the rotating compression rollers at a predetermined pressure, to compress the extruded profile to a desired thickness.

Puller

In exemplary embodiments, the method of forming an extruded article is operated in a continuous fashion, so that the extrudate continuously advances from the extruder through each subsequent process step. Any method may be used to advance the extruded profile through the process. In an exemplary embodiment, a puller may be disposed downstream of the extruding, decorating, shaping/cooling and/or embossing stations to draw the material through the machine by maintaining a longitudinal tension on the extruded profile from the die until the final cutting and finishing operation. In some embodiments, one or more apparatus may be introduced before, after or between process steps to push and/or pull the extruded profile through the process.

Saw (Cut and Collect Profiles)

In exemplary embodiments, the final work product may be cut into predetermined lengths to form a finished product. The finished products may have any necessary or desired length. The finished products may be collected and assembled in any necessary or desired configuration.

Example: Process to Form Extruded Deck Board

An exemplary method will be described in reference to manufacturing an extruded board, such as commonly used for decking. Referring to FIG. 1, the resultant extruded board 100 has a generally rectangular profile and a substantially uniform cross-section in its longitudinal direction. The extruded board 100 has a top surface 110, a bottom surface, 120 and a first side surface 130 and second side surface 140 extending between and joining the top and bottom surfaces. The surfaces of the extruded board 100 may be generally planar, or they may have one or more contours, projections or grooves formed therein. The extruded board 100 has an extruded base 150, having at least one surface that has a decorative wood grain appearance and texture. The at least one decorated surface has a printed layer 170, and an extruded protective coating 160. The at least one decorated surface is embossed to provide a wood grain texture. In the example described below, the extruded board 100 is decorated on at least a part of its top surface 110, first side surface 130, and second side surface 140. However, it will be understood that the extruded board 100 could be decorated on more surfaces, fewer surfaces, or different surfaces than described herein.

Figure 2:
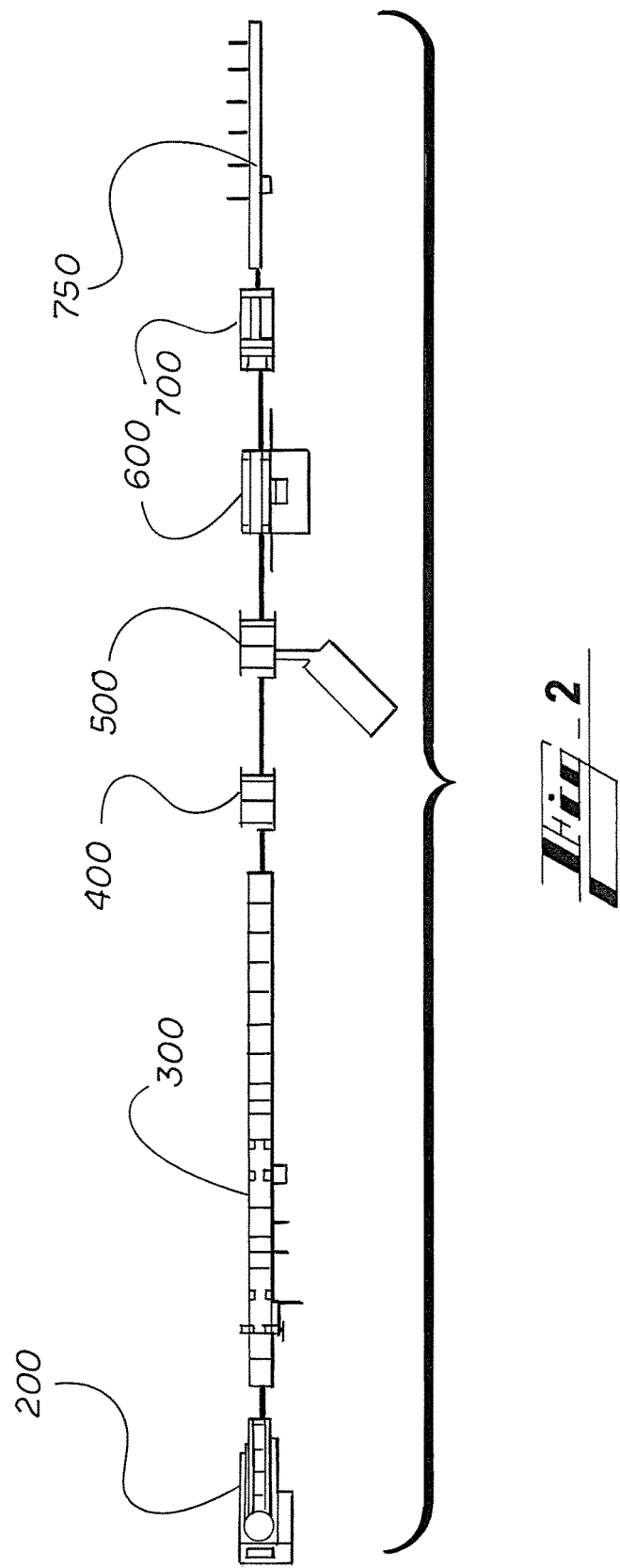
FIG. 2 illustrates an extrusion process and its components, according to an exemplary embodiment.

Referring to FIG. 2, the extruded board 100 is made in a continuous or semi-continuous manufacturing process, having an extrusion station 200, a calibration station 300, a hot stamp station 400, an acrylic/embossing station 500, a puller 600, and a cutting station 700.

Figure 3:
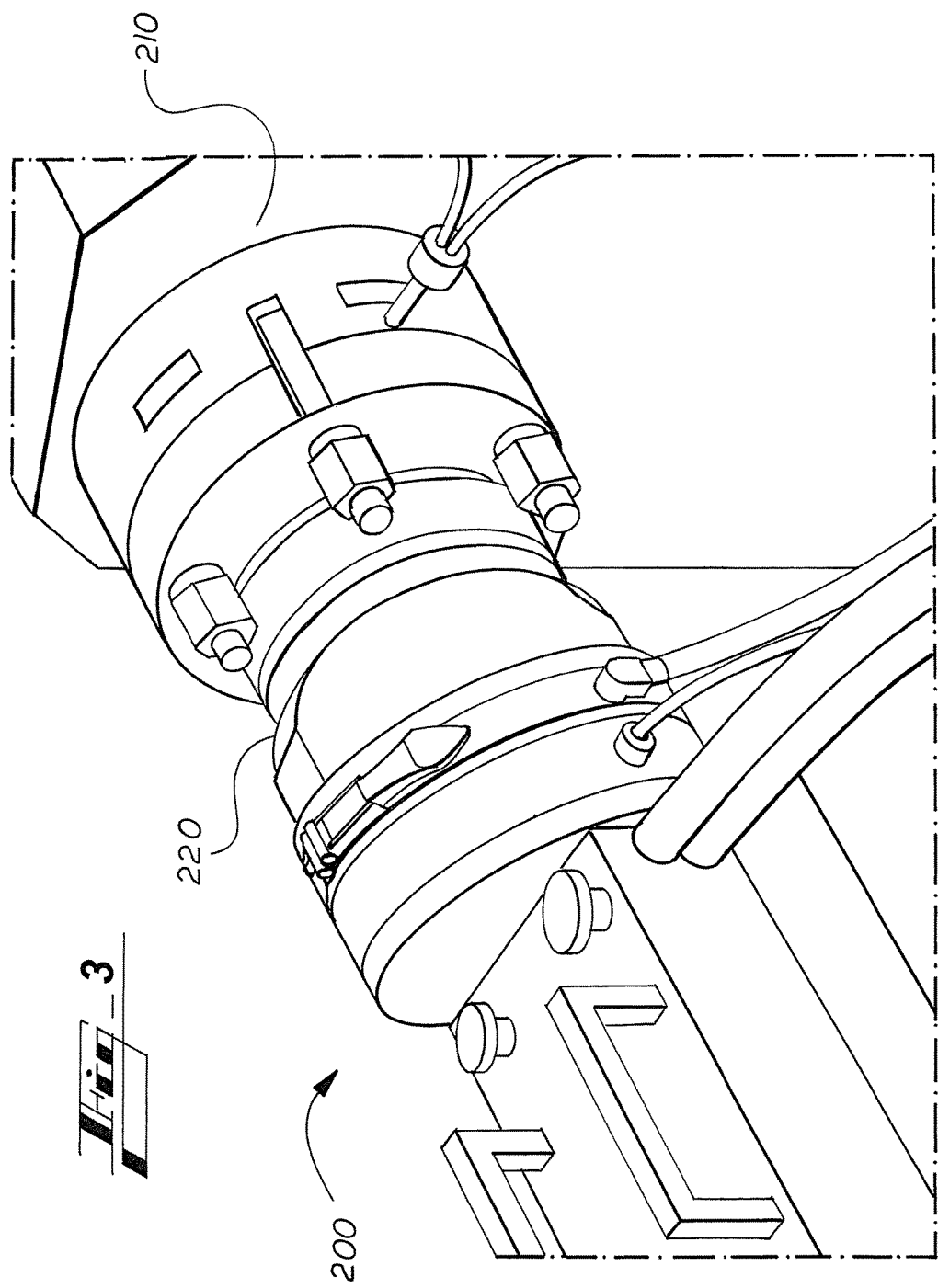
FIG. 3 illustrates an extrusion die, according to an exemplary embodiment.

Referring to FIG. 3, in the extrusion station 200, a PVC formulation is melted and mixed inside an extruder 210. The molten formulation is fed, under pressure, from the extruder 210 to a die 220, where it is pushed through an aperture (not shown) to four' a continuous extruded member having a generally rectangular cross-sectional shape. The resultant extruded member is a cellular (foamed) PVC extrusion.

Figure 4:
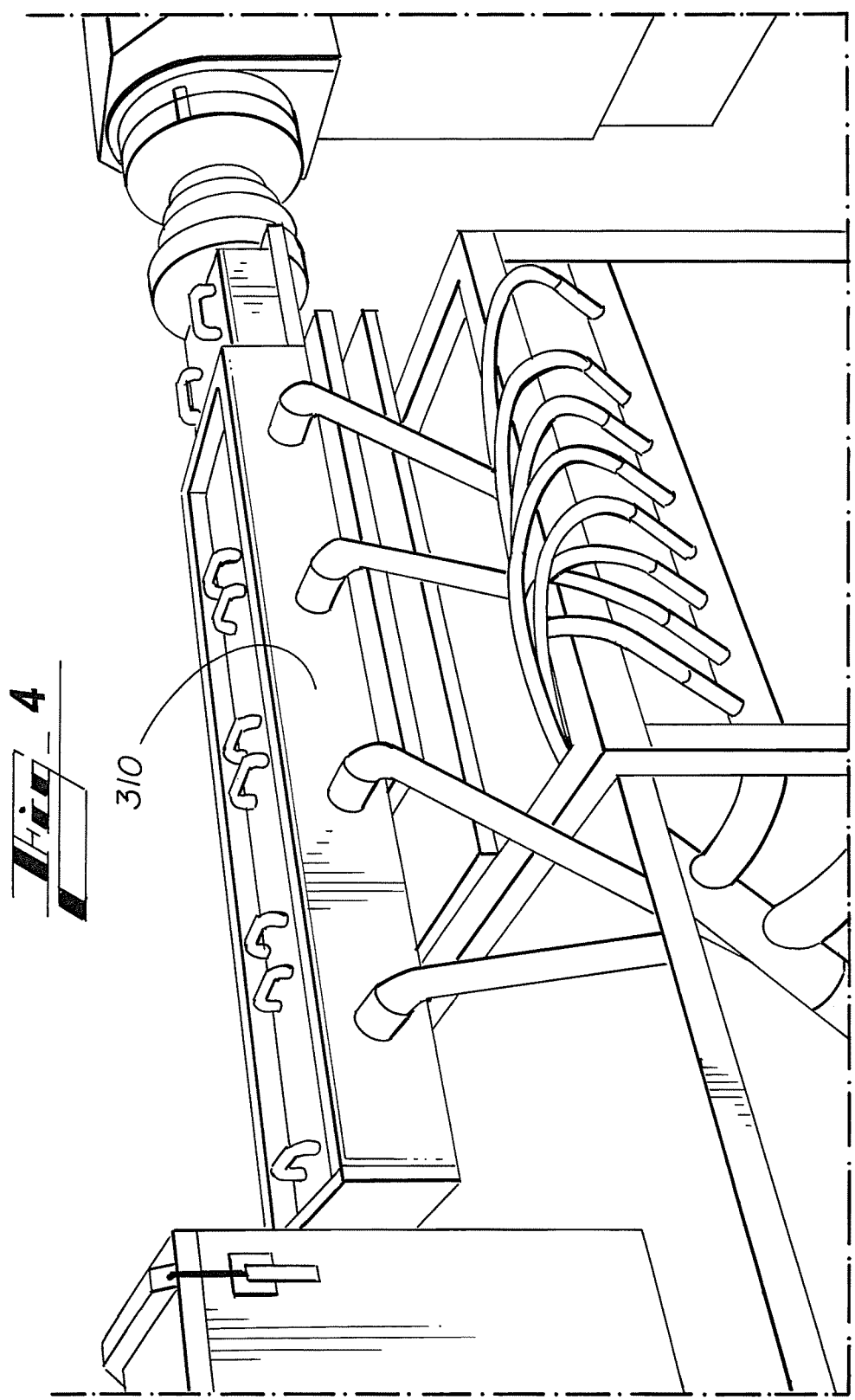
FIG. 4 illustrates a dry calibration process, according to an exemplary embodiment.
Figure 5:
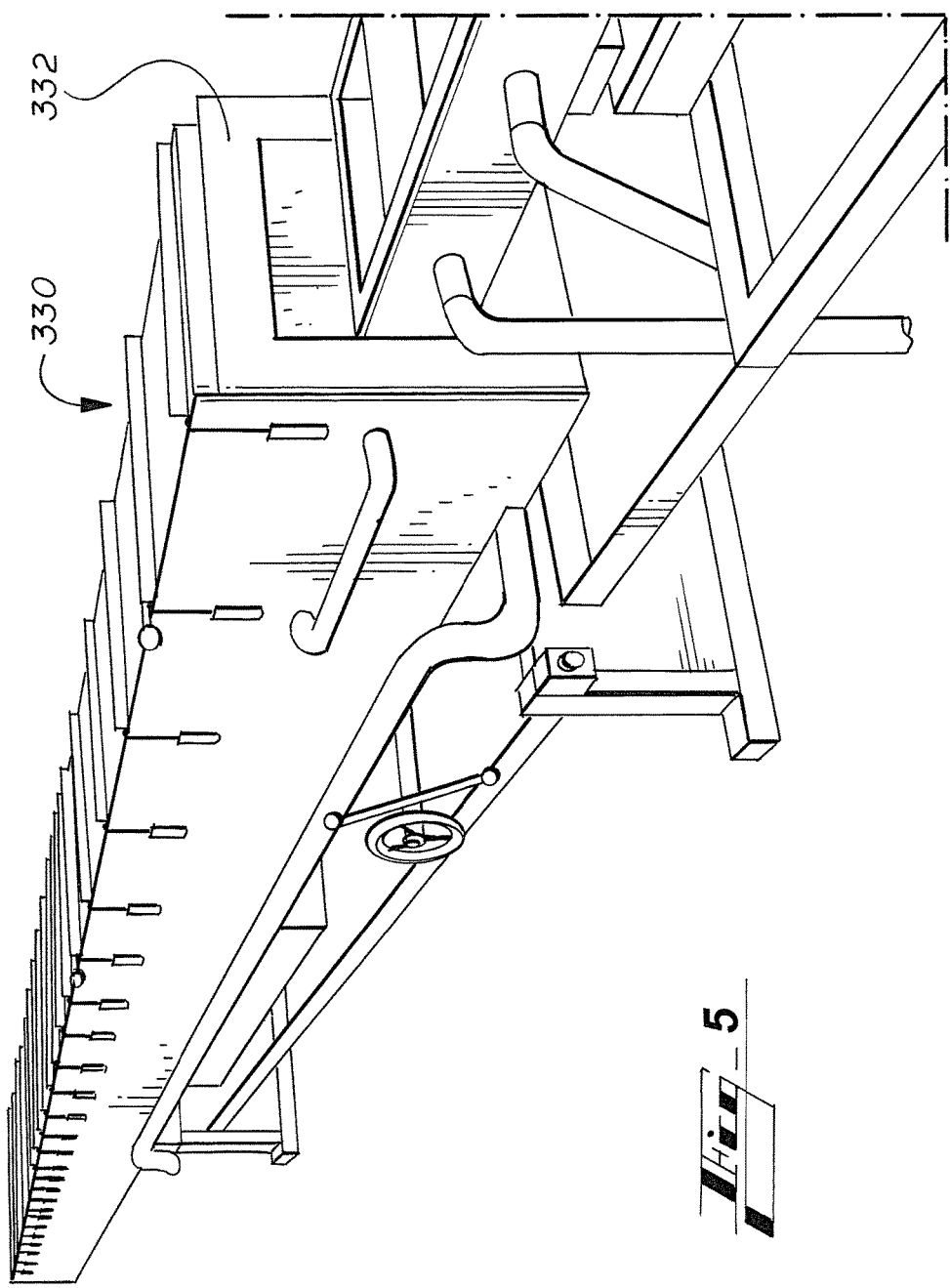
FIG. 5 illustrates a wet calibration process, according to an exemplary embodiment.

The extruded member exits the die 220, and is transported to a calibration station 300. At this point in the process, the extruded member is hot and is substantially malleable. The calibration station 300 manipulates the surfaces of the extruded member to continue to shape the extruded member, and cools the extruded member to harden extruded member in substantially its final shape. Referring to FIG. 4, the calibration station 300 has a first dry calibration mechanism 310. Referring to FIG. 5 The extruded member is transported from the dry calibration mechanism 310 to a wet calibration mechanism 330. The wet calibration mechanism 330 also includes a vacuum tank 332 with a chilled water spray, that dispenses chilled water to the surfaces of the extruded member. The chilled water is maintained at between about 45° F. to about 65° F. to cool the extruded member, as necessary or desired. At the exit of the wet calibration mechanism 330, the extruded member is substantially rigid extruded board 100, having a cross-sectional shape that is nearly the same as that of the finished product.

Figure 6:
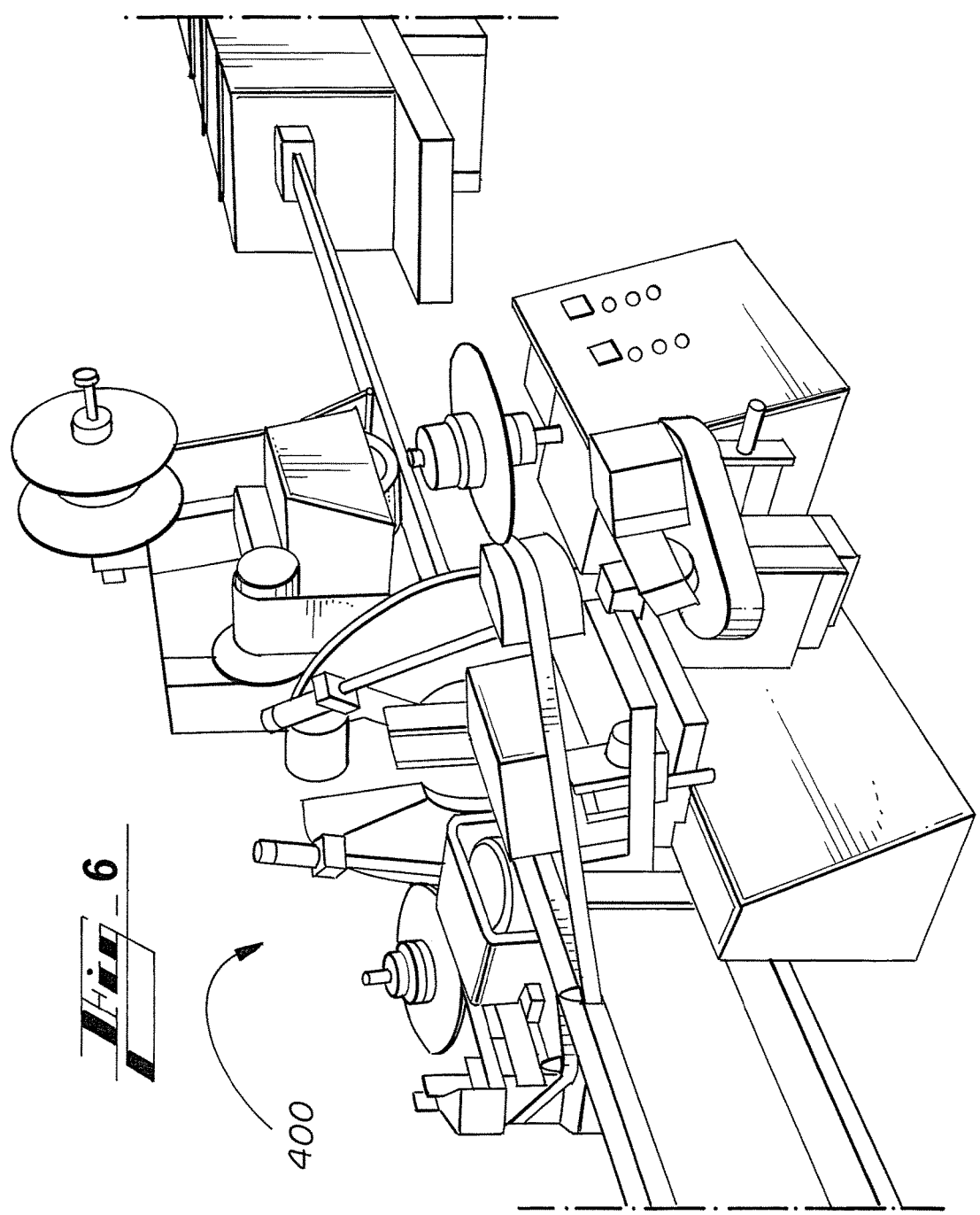
FIG. 6 illustrates a hot stamp station, according to an exemplary embodiment.
Figure 7:
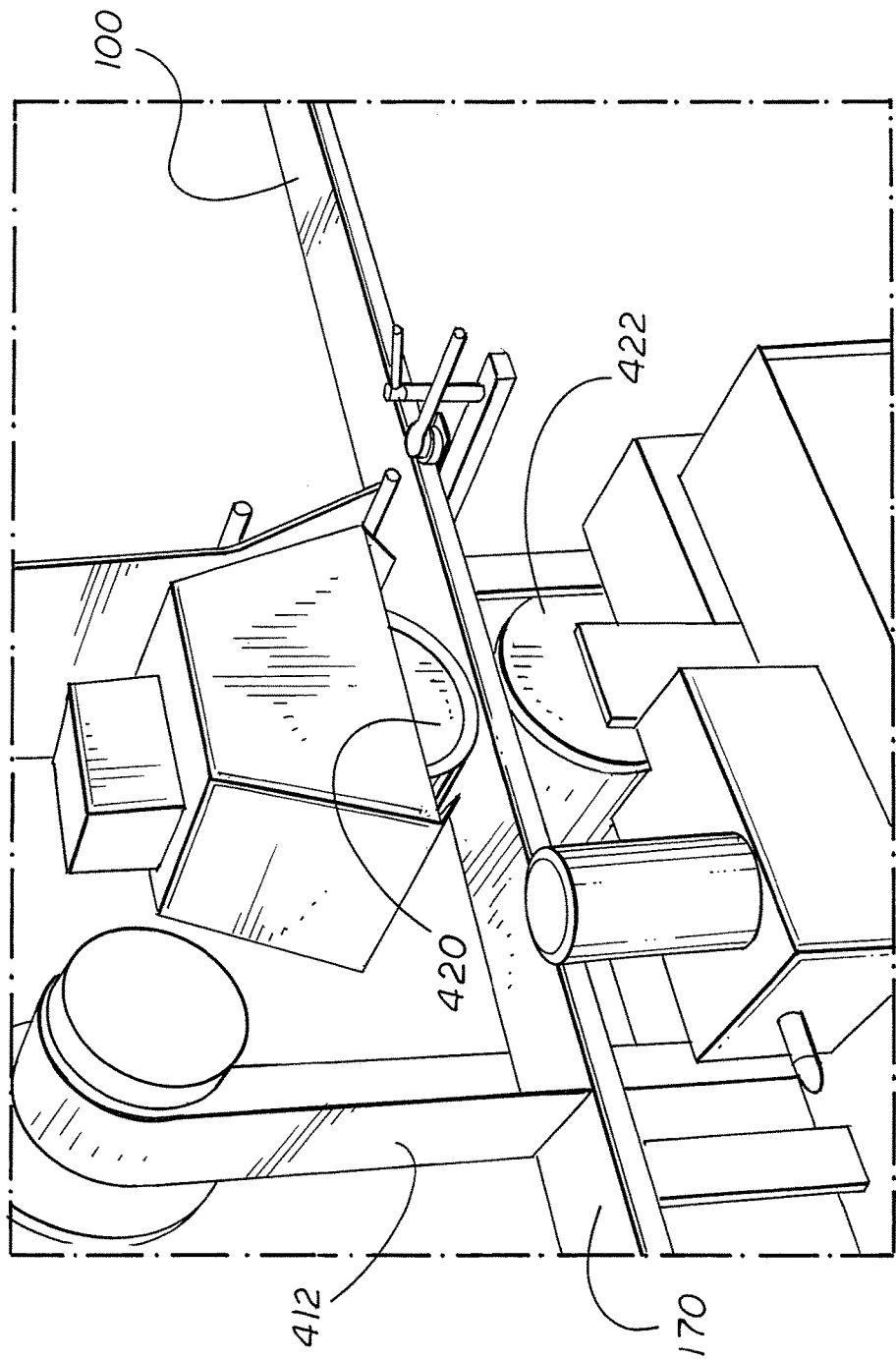
FIG. 7 illustrates a hot stamp station, according to an exemplary embodiment.

The extruded board 100 is then transported to a hot stamp station 400, where a decorative printed layer 170 is applied to the top surface 110 of the extruded member. Referring to FIGS. 6-7, a roll or spool is provided, in which a continuous layer of the printed layer 170 is provided on a carrier film 412 (e.g., MYLAR film). The printed layer 170 has a printed wood grain pattern, and an adhesive material. The roll or spool is unwound and transported to the hot stamp station 400, and oriented so that the printed layer 170 is between the carrier layer 412 and the top surface 110 of the extruded board 100. The extruded board 100, the printed layer 170, and the carrier layer 412, are all transported between a rotating heat transfer roll 420 and a rotating support roll 422. The rotating heat transfer roll 420 and support roll 422 are configured to apply a predetermined pressure to compress the carrier layer 412 toward the top surface 110 of the extruded board 100. In addition, the heat transfer roll 420 applies heat to the outward facing surface of the carrier layer 412. The heat and the pressure activate the adhesive material in the printed layer 170, which adheres the printed layer 170 to the top surface 110 of the extruded board 100. Once the printed layer 170 is adhered to the extruded board 100, the carrier film 412 is removed from the process.

In some processes, the printed layer 170 is wider than the top surface 110 of the extruded board 100, and its edges wrap around to first side surface 130 and second side surface 140. In this process, guiding and folding mechanisms are provided to wrap the material around so that the edges of printed layer 170 contact the desired portions of side surfaces 130, 140. In other processes, additional print layers 170 may be provided to attach to desired portions of side surfaces 130, 140. As with the top surface, heat and pressure are applied to the side surfaces 130, 140, to adhere the printed layer 170 to these surfaces of the extruded board 100.

Figure 8:
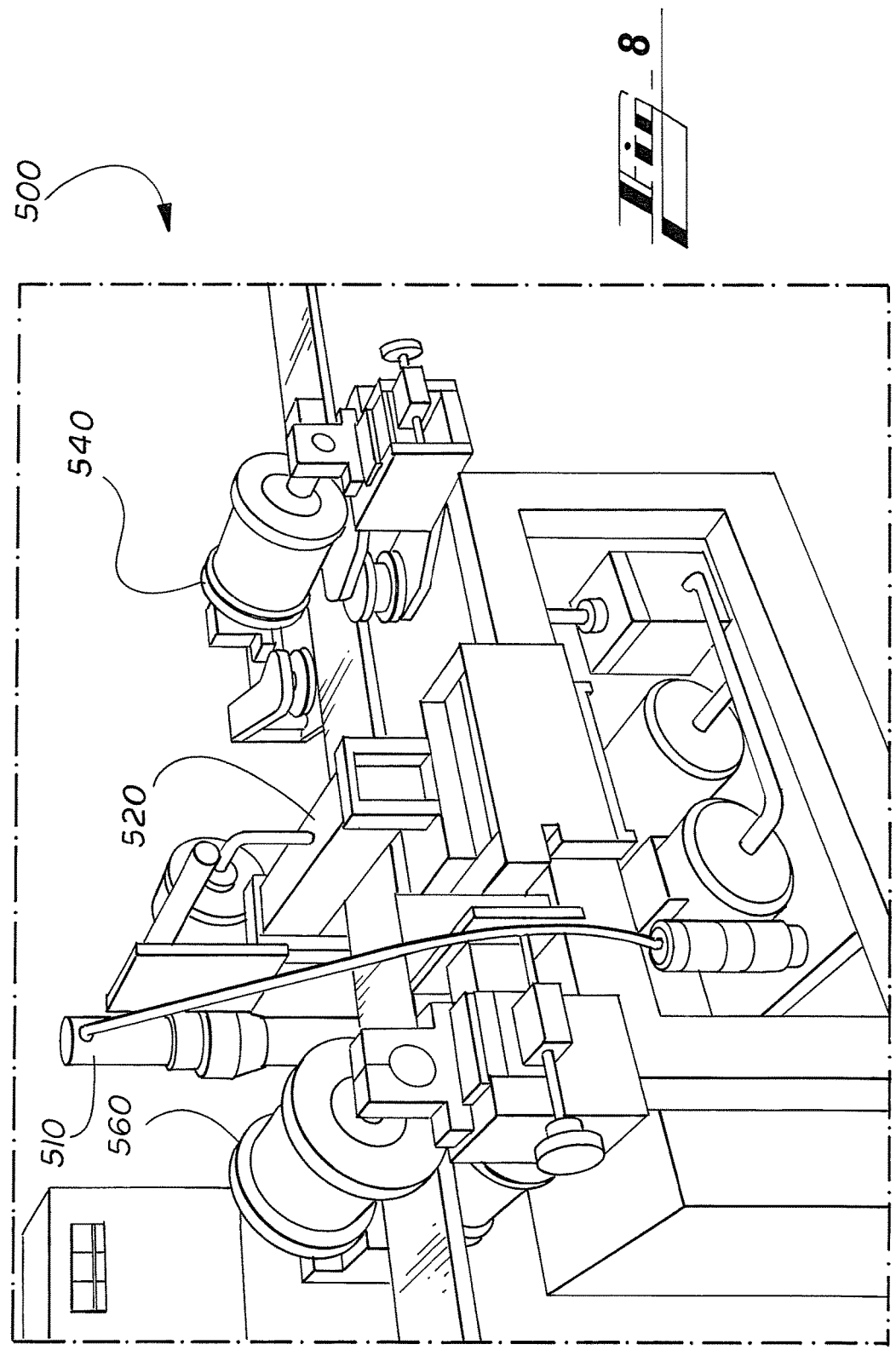
FIG. 8 illustrates a coating/embossing station, according to an exemplary embodiment.
Figure 9:
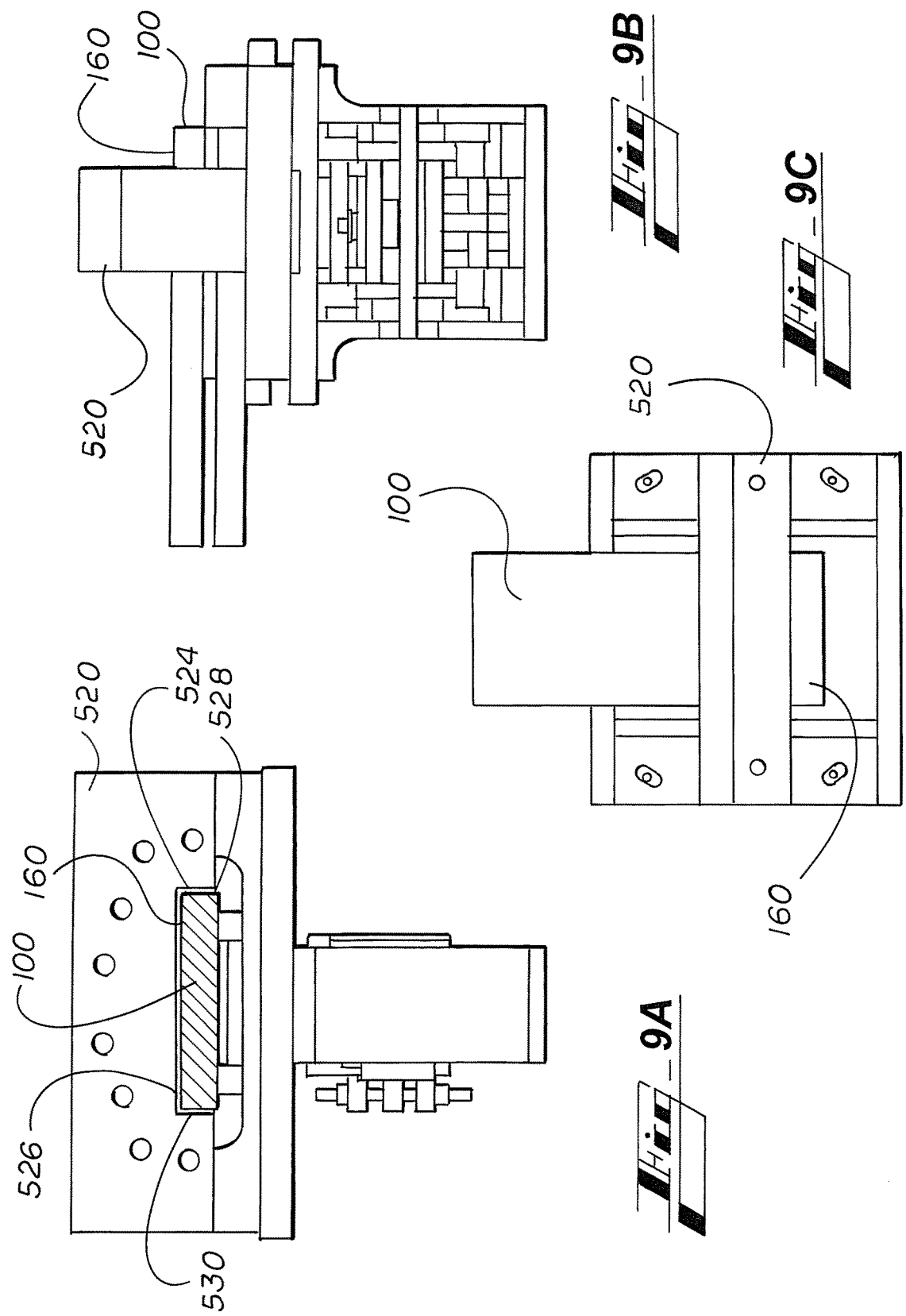
FIGS. 9A-9C illustrate a coating die, according to an exemplary embodiment.
Figure 10:
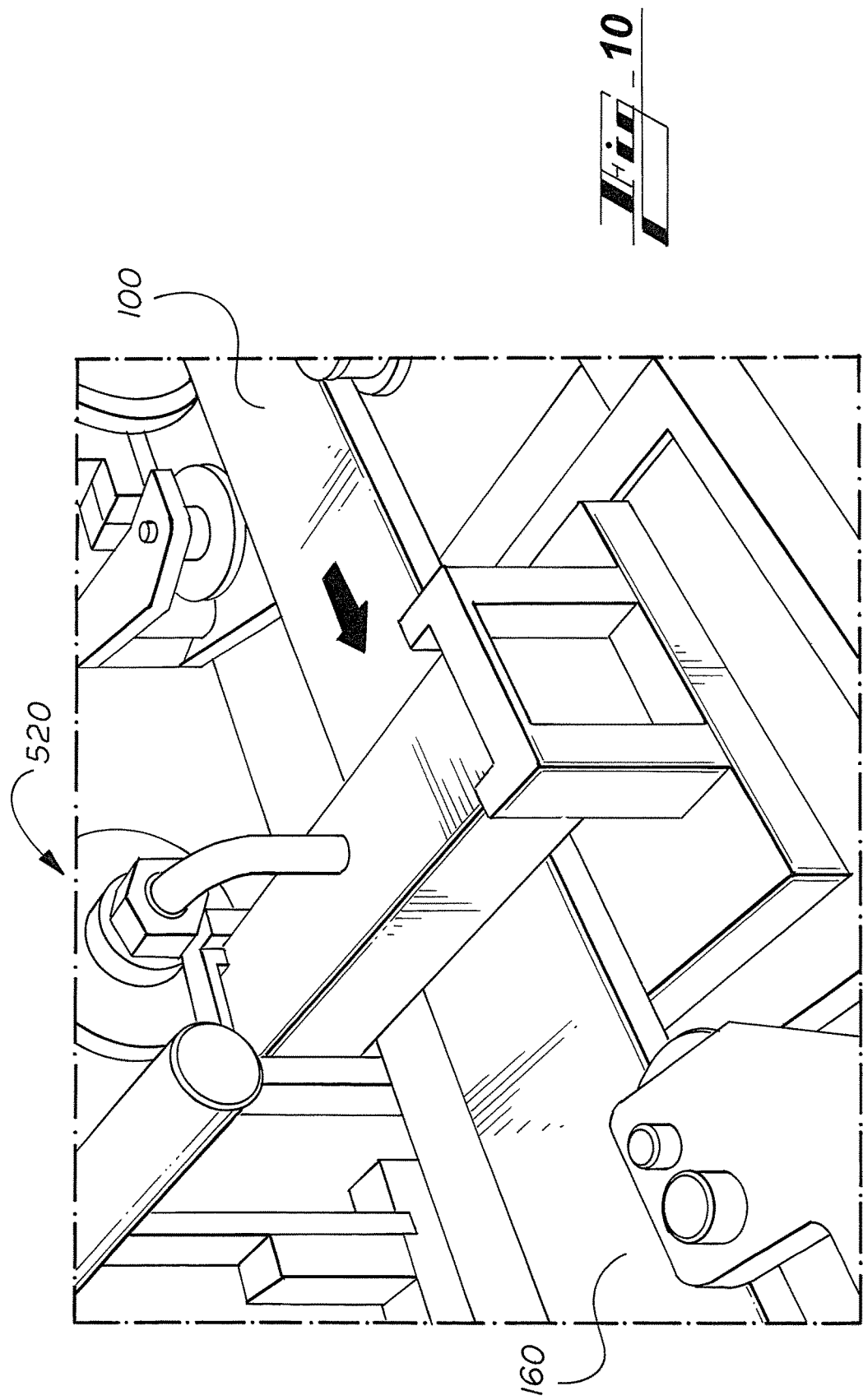
FIG. 10 illustrates a coating die, according to an exemplary embodiment.

Once the printed layer 170 has been laminated to the extruded board 100, a protective coating layer 160 is applied to the outer surface of the printed layer 170. Referring to FIGS. 8-10, in the coating/embossing station 500, an extruder 510 melts and mixes an acrylic coating formulation. The molten coating formulation is forced, under pressure to one or more apertures in the coating die 520. The extruded board 100 passes through the coating die 520 which provides a coating layer 160 to the printed surfaces of the extruded board 100. Where the extruded board 100 has a printing layer 170 on multiple surfaces of the board 100, such as on the top surface 110, first side surface 130 and second side surface 140, the coating die 220 may be configured to have apertures directed at all surfaces. For example, referring to FIGS. 9A-9C, the coating die 520 may have a board opening 524 through which the extruded board 100 passes. The board opening 524 may have a top side 526 that is adjacent to the top surface 110 of the board 100, a first side 528 that is adjacent to the first side 130 of the board 100, and a second side 530 that is adjacent to the second side 140 of the board 100. Each of the respective sides of the board opening 524 has one or more apertures configured to meter molten coating formulation to form a continuous coating layer 160 on the extruded board 100 (covering predetermined portions of top surface 110, first side 130, and second side 140). The extruded coating layer 160 may have any suitable thickness. In an exemplary embodiment the extruded coating layer 160 may have a thickness from about 0.005 inches to about 0.030 inches, or about 0.015 inches.

Figure 11:
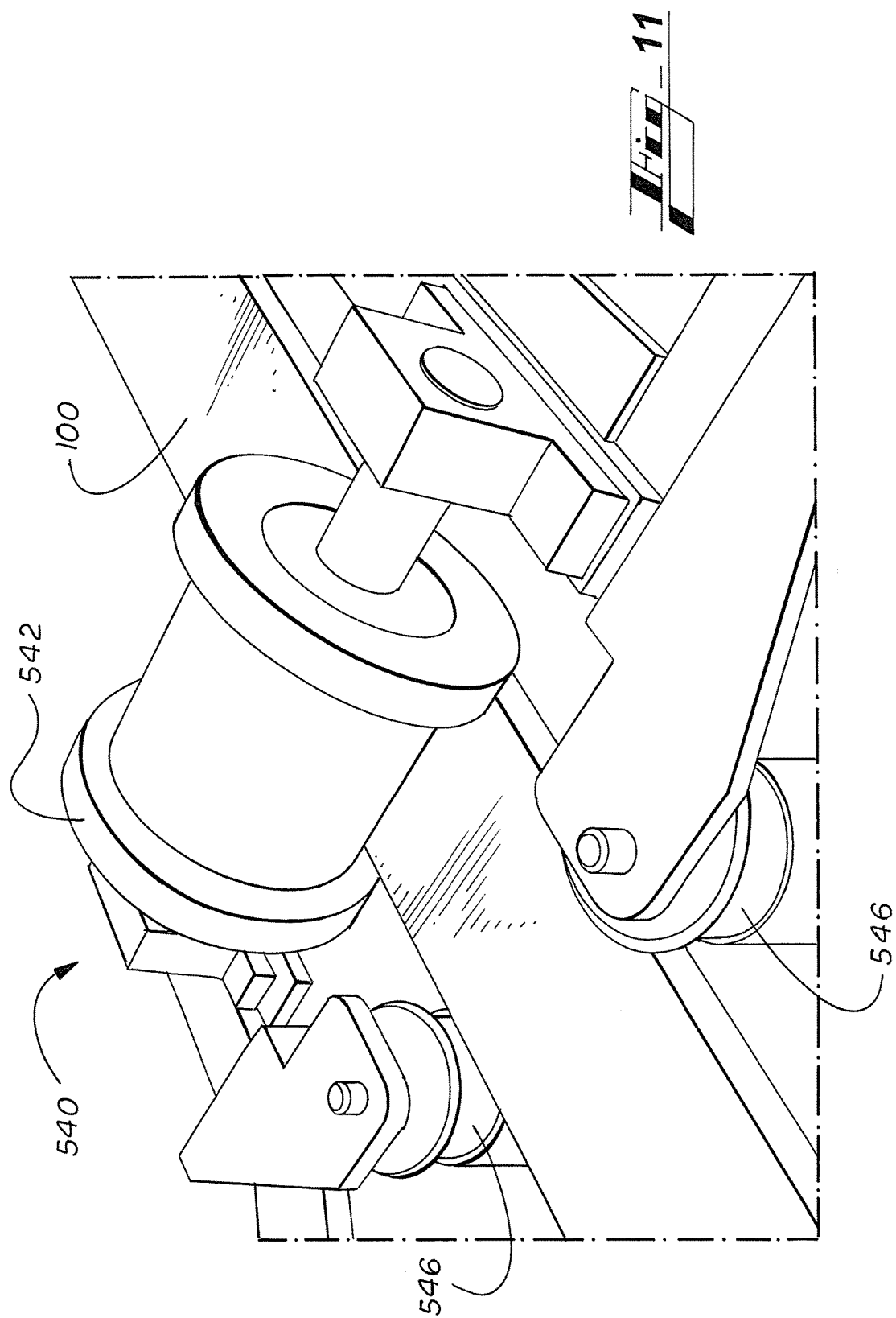
FIG. 11 illustrates a roll former process, according to an exemplary embodiment.

In this coating process, the distance between the top side 110, first side 130, and second side 140 of the extruded board, and the respective sides of the board opening 524 in the coating die 520, determines, in part, the thickness of the coating layer 160. Variations in the shape, size, or position of the extruded board 100 will cause variations in the thickness of the coating layer 160. Various mechanisms may be provided to control the shape and/or position of the extruded board 100 through the board opening 524 in the coating die 520, so that the coating layer 160 may have a substantially constant thickness. For example, referring to FIG. 11, a roll former 540 may be provided upstream of the coating die 520, to compress the board 100 on one or more sides to provide an extruded board 100 with substantially uniform cross-sectional dimensions. The roll former 540 includes a rotating shaping roller 542, which has an outer surface that has a profile shaped to receive the coated surfaces of the extruded board 100. The outer surface of the shaping roller 542 may include an embossing texture to be impressed upon the surface of the extruded board 100. For example, the embossing texture may impart a slight texture to the extruded board 100, to break the surface tension on the printed layer. A support roller may be provided on the opposite side of the extruded board 100 to support the board while the shaping roller 542 shapes the coated surfaces of the board 100. The shaping roller 542 and support roller may cooperate to provide a predetermined pressure on the extruded board 100 that passes therethrough. The roll former 540 may be used to adjust the thickness and texture of the coating layer 160. One or more side rollers 546 may be positioned adjacent the sides 130, 140 of the extruded board 100. These rollers may be used to control the side-to-to side position, dimensions, or both, of the board prior to entering the coating die 520.

Figure 12:
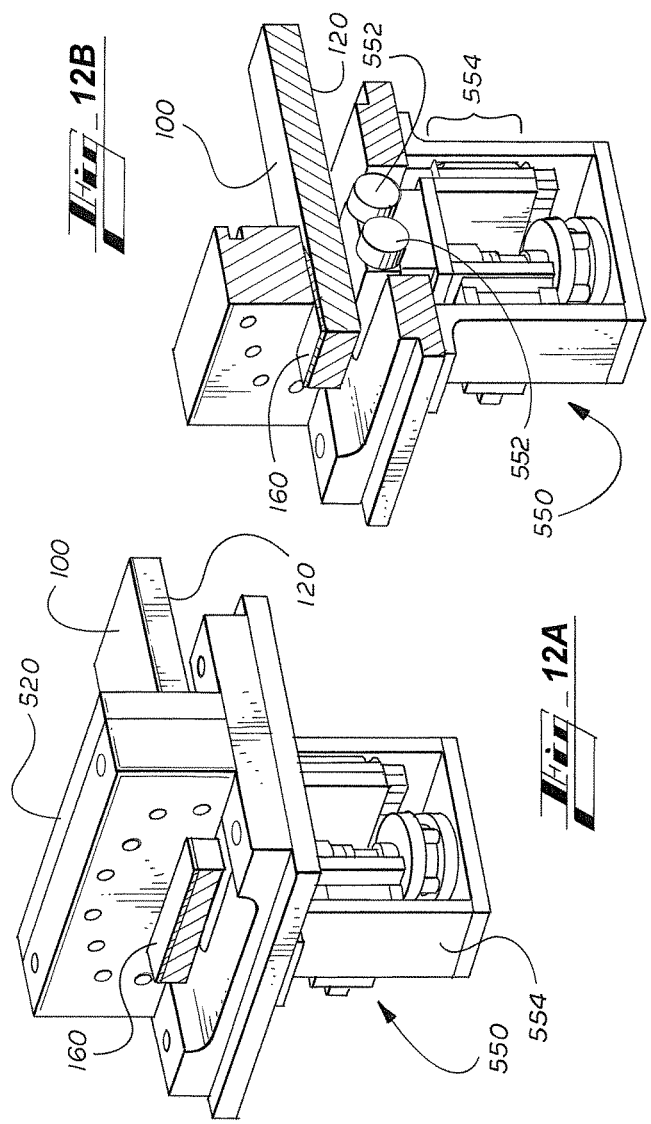
FIGS. 12A-12B illustrate a coating die with a floating bottom support, according to an exemplary embodiment.

Referring to FIGS. 12A-B, the exemplary process may include a floating bottom support 550 that can provide adjustments for the extruded board 100 as it passes through the coating die 520. The floating bottom support 550 is located directly beneath the board opening 524 in the coating die 520, supporting the board on an uncoated side (e.g., bottom surface 120). As the extruded board 100 passes through the board opening 524, the floating bottom support 550 makes vertical height adjustments to the board, so that any variations in height of the board are compensated by the support device 550, to maintain a substantially constant coating thickness on the coated side of the board. For example, where the target coating thickness on the board is x, and the target thickness of the board is y, then the target distance between the top of the die 520 and the floating bottom support 550 is x+y. If the thickness of the board diminishes to y−z, then the bottom support 550 adjusts upward from the target location, moving the board upward by a dimension of z so that the coating thickness x remains unchanged. If the thickness of the board increases to y+z, then the bottom support 550 adjusts the location of the board downward by a dimension of z so that the coating thickness x remains unchanged.

The floating bottom support 550 may include a support device 552 operably coupled with a height adjustment device 554. The support device 552 may include one or more of a roller, belt, conveyor, plate, or any other device that can support the board 100 through the coating die 520. In an exemplary embodiment, the support device 552 is a roller that reduces the drag on the extruded board as it passes through the coating die 520. The height adjustment device 554 may include one or more pneumatic cylinders, springs, or any other device that can provide height adjustment to the support device 552. In an exemplary embodiment, the height adjustment device is a pneumatic cylinder, whereby adjustment of the support device 552 is achieved by regulating air pressure into the pneumatic cylinder.

Figure 13:
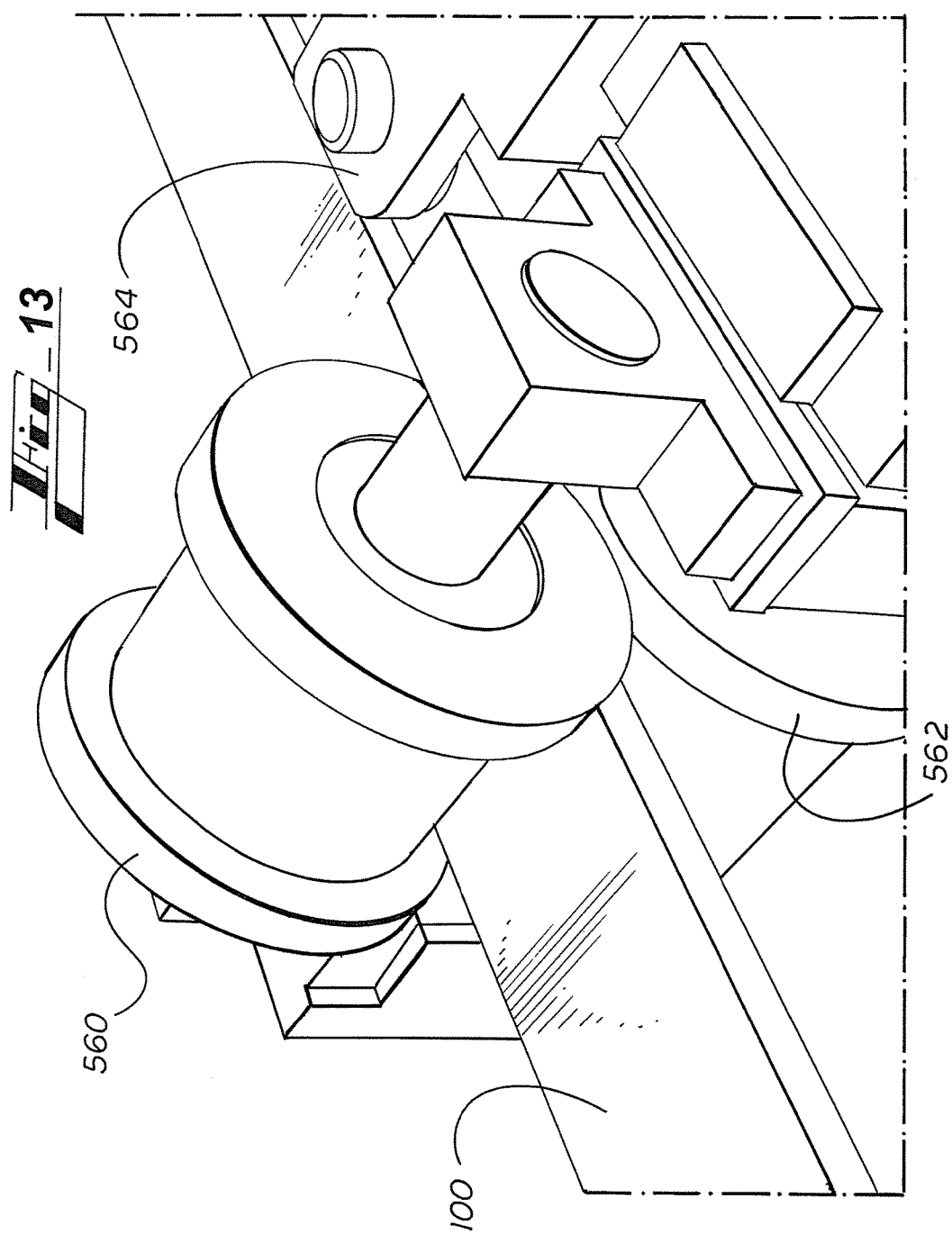
FIG. 13 illustrates an embossing station, according to an exemplary embodiment.

After the extruded board 100 exits the coating die 520, the coated board is embossed. Referring to FIG. 13, the board may pass between an embossing roller 560 and a support roller 562. The embossing roller 560 has a textured surface that contacts a surface of the board 100. Any texture may be provided on the surface of the embossing roller 560, as necessary or desired. For example, the texture of the embossing roller 560 may be configured to provide a wood grain texture on the extruded board. The support roll 562 may be operably coupled with the embossing roller 562, to provide a predetermined pressure on the extruded board 100 that is passing therebetween. The pressure may be sufficient to provide a suitable embossed pattern on the surface of the board 100 and/or compress the board to a desired thickness. In addition, one or more side rolls 564 may be provided upstream or downstream of the embossing roller 560, to contact the sides 130/140 of the board 100, to provide an embossed pattern thereon, or compress the profile to a desired width.

Figure 14:
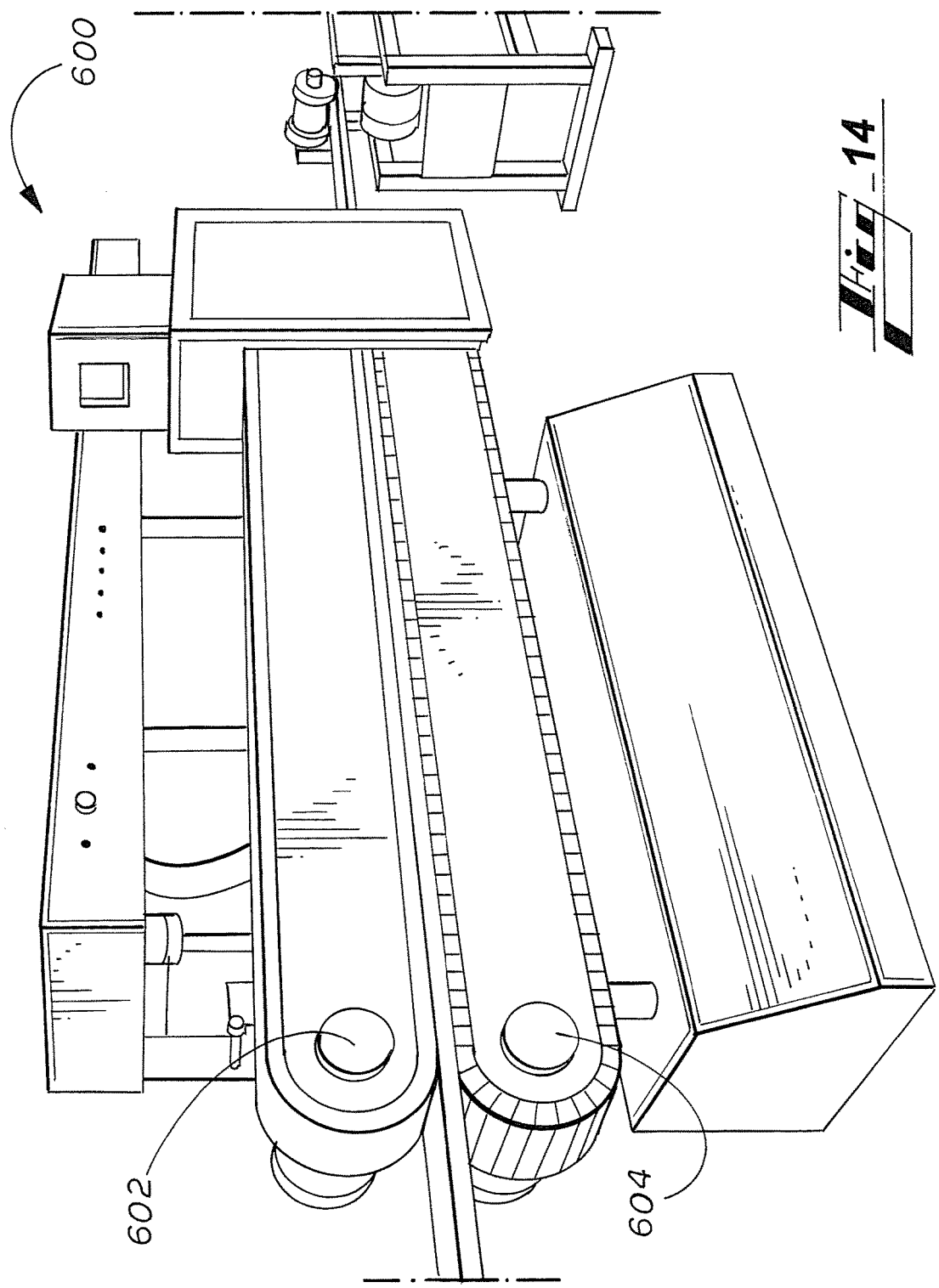
FIG. 14 illustrates a puller, according to an exemplary embodiment.

Referring to FIG. 14, a puller 600 may be provided to pull the extruded board 100 through the aforementioned processes. The puller 600 may include any various means for guiding and pulling the extruded board 100. For example, the puller 600 may include an upper conveyor 602 and a lower conveyor 604 that are operably coupled to apply pressure to the extruded board 100, to draw it through the process.

Figure 15:
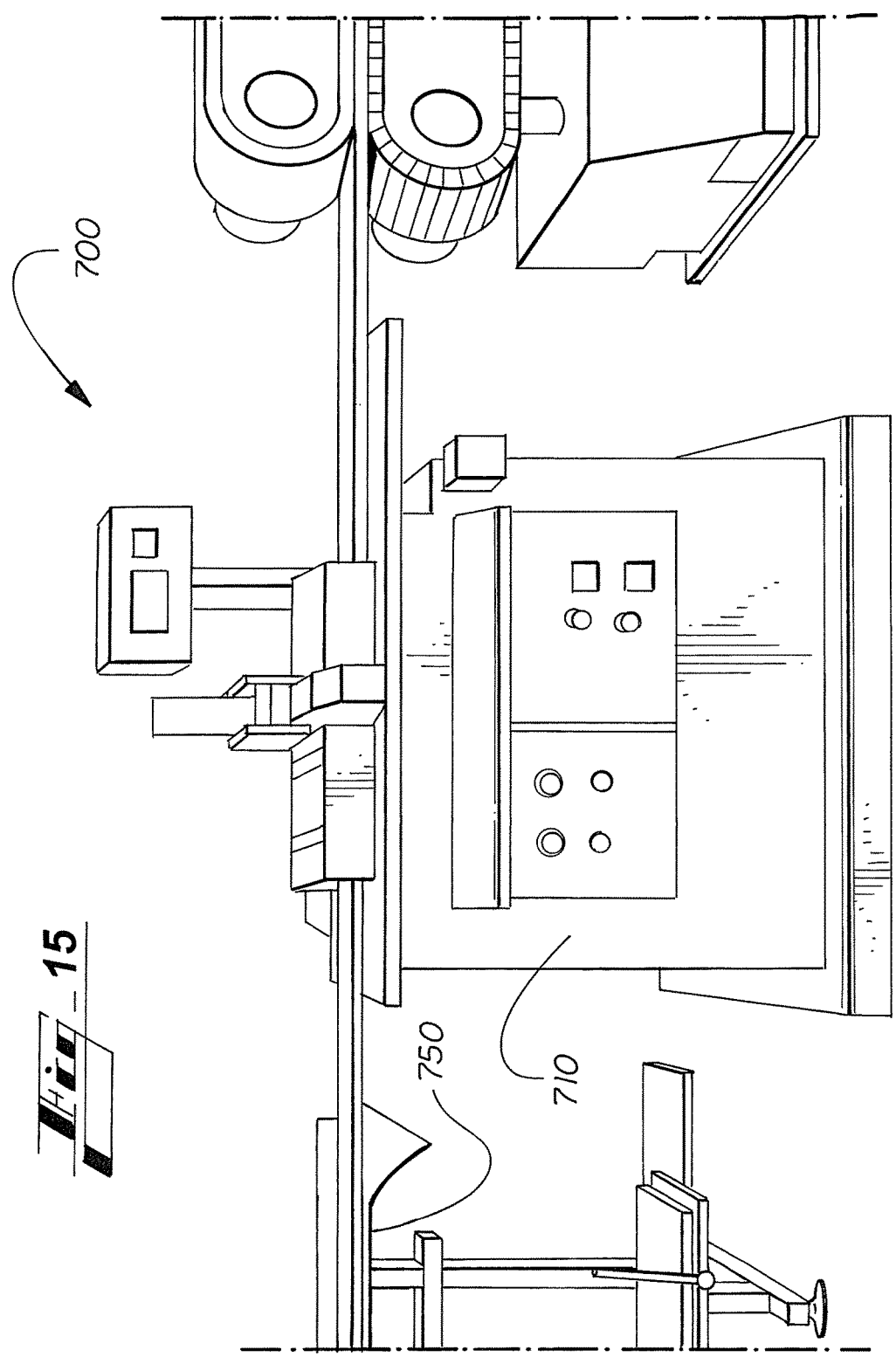
FIG. 15 illustrates a cutting station, according to an exemplary embodiment.

In the various embodiments, the extruded board 100 may be separated into a plurality of boards having a predetermined length. Referring to FIG. 15, the extruded board 100 may pass through a cutting station 700, including a saw 710, which cuts the board at predetermined intervals. Then the cut boards may be collected and assembled, such as on an off-feed table 750, for further handling.

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

What is claimed is:

1. A process for applying an outer layer to an extruded member comprising continuously advancing an extruded member through a coating die and applying an outer layer material to the extruded member with the coating die while a floating support supports the extruded member and automatically makes vertical adjustments up and down to the extruded member to maintain a substantially constant thickness of the outer layer material.

2. The process of claim 1, wherein said floating support makes vertical adjustments with spring force or pressure and the extruded member includes rigid or cellular polymeric material.

3. The process of claim 2, wherein the extruded member includes polyvinyl chloride.

4. The process of claim 1, further comprising applying the outer layer material to a decoration on a surface of the extruded member.

5. The process of claim 4, wherein the decoration includes a foil layer.

6. The process of claim 5, wherein the outer layer material is transparent or translucent.

7. The process of claim 4 wherein the outer layer material is transparent or translucent.

8. The process of claim 2, further comprising applying the outer layer material to a decoration on a surface of the extruded member.

9. The process of claim 3, further comprising applying the outer layer material to a decoration on a surface of the extruded member.

10. The process of claim 9 wherein the outer layer material is transparent or translucent.

11. The process of claim 6, wherein the outer layer material includes an acrylic-containing resin.

12. The process of claim 7, wherein the outer layer material includes an acrylic-containing resin.

13. The process of claim 10 wherein the outer layer material includes an acrylic-containing resin.

14. The process of claim 9, wherein the decoration includes a foil layer.

15. The process of claim 14, wherein the outer layer material includes an acrylic-containing resin.

16. The process of claim 15, wherein the decoration includes a wood grain pattern.

17. The process of claim 16, further comprising embossing a texture to the outer layer.

18. The process of claim 4, wherein the decoration includes a wood grain pattern.

19. The process of claim 18, further comprising embossing a texture to the outer layer.

20. The process of claim 19, wherein the decoration includes a foil layer.

* * * * *